United States Patent
Hommeltoft

(10) Patent No.: US 12,286,602 B2
(45) Date of Patent: Apr. 29, 2025

(54) PROCESS FOR REMOVING CHLORIDE FROM LIPID FEEDSTOCKS USING REJUVENATED CATALYST

(71) Applicant: Chevron U.S.A. Inc., San Ramon, CA (US)

(72) Inventor: Sven Ivar Hommeltoft, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 18/433,789

(22) Filed: Feb. 6, 2024

(65) Prior Publication Data

US 2024/0360379 A1   Oct. 31, 2024

Related U.S. Application Data

(60) Provisional application No. 63/462,300, filed on Apr. 27, 2023.

(51) Int. Cl.

| | |
|---|---|
| *C11B 3/02* | (2006.01) |
| *B01J 21/04* | (2006.01) |
| *B01J 23/02* | (2006.01) |
| *B01J 23/92* | (2006.01) |
| *B01J 38/48* | (2006.01) |
| *C11B 3/06* | (2006.01) |
| *C11C 1/08* | (2006.01) |
| *C11C 3/12* | (2006.01) |

(52) U.S. Cl.
CPC .................. *C11B 3/02* (2013.01); *B01J 21/04* (2013.01); *B01J 23/02* (2013.01); *B01J 23/92* (2013.01); *B01J 38/485* (2013.01); *C11B 3/06* (2013.01); *C11C 1/08* (2013.01); *C11C 3/123* (2013.01); *C11C 3/126* (2013.01)

(58) Field of Classification Search
CPC ... C11C 3/126; C11C 1/08; B01J 23/02; B01J 23/92; C11B 3/02; C11B 3/06
See application file for complete search history.

(56) References Cited

U.S. PATENT DOCUMENTS

| | | | | |
|---|---|---|---|---|
| 2,480,627 | A * | 8/1949 | Bodkin | B01J 21/20 502/25 |
| 4,477,582 | A * | 10/1984 | Miale | B01J 29/40 208/120.25 |
| 2022/0041938 | A1* | 2/2022 | Hommeltoft | C10G 67/02 |

FOREIGN PATENT DOCUMENTS

WO   2022243760 A1   11/2022

OTHER PUBLICATIONS

Lu Yang, et al., Preparation, characterization, and catalytic behavior of xMO/yNaZSM-5 catayst for dichorohydrin dechlorination reaction, Asia-Pacific Journal of Chemical Engineering, vol. 13, No. 3, pp. 1-8 (Year: 2018).*
Lang et al., "Preparation, characterization, and catalytic behavior of xMO/yNaZSM- 5 catalyst for dichlorohydrin dechlorination reaction," Asia-Pacific Journal of Chemical Engineering, John Wiley & Sons Ltd, US, May 2, 2018, vol. 13, No. 3, 8 pages.
PCT/US2024/014748, International Search Report & Written Opinion, Jun. 6, 2024, 15 pages.

* cited by examiner

*Primary Examiner* — Yate' K Cutliff
(74) *Attorney, Agent, or Firm* — Michael E. Carmen; Howard Owens

(57) ABSTRACT

A process involves sequentially treating a plurality of lipid feedstocks comprising a set of lipid feedstocks each having a chloride content of at least about 2 ppm with a metal oxide catalyst on an oxide support under first treating conditions to produce respective treated streams of the set of lipid feedstocks having a chloride content less than 1 ppm until a given one of the respective treated streams has a chloride content greater than 1 ppm and the metal oxide catalyst is converted to a spent metal oxide catalyst, converting the spent metal oxide catalyst to a rejuvenated metal oxide catalyst, and treating one or more additional lipid feedstocks each having a chloride content of at least about 2 ppm with the rejuvenated metal oxide catalyst under second treating conditions to produce one or more respective treated streams each having a chloride content less than 1 ppm.

20 Claims, No Drawings

PROCESS FOR REMOVING CHLORIDE FROM LIPID FEEDSTOCKS USING REJUVENATED CATALYST

PRIORITY CLAIM

The present application claims priority to U.S. Provisional Patent Application Ser. No. 63/462,300, entitled "Process For Removing Chloride From Lipid Feedstocks Using Rejuvenated Catalyst," filed Apr. 27, 2023, the content of which is incorporated by reference herein in its entirety.

BACKGROUND

There is an increasing interest in alternative feedstocks for replacing at least partly crude oil, in the production of hydrocarbons suitable as fuels or fuel components, for example, as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

SUMMARY

In accordance with an illustrative embodiment, a process comprises:
sequentially treating a plurality of lipid feedstocks comprising a set of lipid feedstocks each having a chloride content of at least about 2 ppm with a metal oxide catalyst on an oxide support under first treating conditions to produce respective treated streams of the set of lipid feedstocks each having a chloride content less than 1 ppm until a given one of the respective treated streams of the set of lipid feedstocks has a chloride content greater than 1 ppm and the metal oxide catalyst on the oxide support is converted to a spent metal oxide catalyst on the oxide support,
converting the spent metal oxide catalyst on the oxide support to a rejuvenated metal oxide catalyst on the oxide support, and
treating one or more additional lipid feedstocks each having a chloride content of at least about 2 ppm with the rejuvenated metal oxide catalyst on the oxide support under second treating conditions to produce one or more respective treated streams each having a chloride content less than 1 ppm.

DETAILED DESCRIPTION

Various illustrative embodiments described herein are directed to processes for removing chloride and other impurities from lipid feedstocks utilizing rejuvenated catalysts to provide purified lipid feedstocks that can be used for refinery processing.

Definitions

The term "lipid" is known in the art and refers to fatty acids and their derivatives. Accordingly, examples of lipids include fatty acids (both saturated and unsaturated); glycerides or glycerolipids, also referred to as acylglycerols (such as monoglycerides (monoacylglycerols), diglycerides (diacylglycerols), triglycerides (triacylglycerols, TAGs, or neutral fats); phosphoglycerides (glycerophospholipids); nonglycerides (sphingolipids, sterol lipids, including cholesterol and steroid hormones, prenol lipids including terpenoids, fatty alcohols, waxes, and polyketides); and complex lipid derivatives (sugar-linked lipids or glycolipids, and protein-linked lipids).

The term "fatty acid" refers to a monocarboxylic acid having an aliphatic chain containing about 3 to about 39 carbon atoms, and more particularly about 7 to about 23 carbon atoms. The aliphatic chain may be linear or branched and may be saturated or unsaturated (e.g., contain one or more carbon-carbon double bonds).

The term "bio-oil" means a liquid product produced from biomass by a thermochemical process. Bio-oil may include bio-derived hydrocarbon fractions and oxygenated hydrocarbons such as carboxylic acids, alcohols, aldehydes, ketones, etc.

The term "renewable feedstock" as used herein refers to a material originating from a renewable resource (e.g., plants) and non-geologically derived. The term "renewable" is also synonymous with the term "sustainable", "sustainably derived", or "from sustainable sources". The term "geologically derived" means originating from, for example, crude oil, natural gas, or coal. "Geologically derived" materials cannot be easily replenished or regrown (e.g., in contrast to plant- or algae-produced oils).

The term "fresh catalyst" or "fresh metal oxide catalyst on an oxide support" as used herein denotes a catalyst which has not previously been used in a catalytic process.

The term "spent catalyst" or "spent metal oxide catalyst on an oxide support" as used herein denotes a catalyst that has less chloride removing activity at the same or similar reaction conditions (e.g., temperature, pressure, inlet flows, etc.) than the catalyst had when it was originally exposed to the process. This can be due to a number of reasons, where several non-limiting examples of causes of the catalyst having less chloride removing activity include cation or anion substitution, acidification of the catalyst surface, metal component depletion and/or chemical or compositional changes.

The term "rejuvenated catalyst" or "rejuvenated metal oxide catalyst on an oxide support" as used herein denotes a catalyst that had become spent, as defined above, and was then subjected to a process that increased its chloride removing activity to a level greater than it had as a spent catalyst. The rejuvenated catalyst typically has a chloride removing activity that is equal to or substantially similar to the chloride removing activity of the fresh catalyst.

The term "hydroprocessing" generally encompasses all processes in which a hydrocarbon feedstock is reacted with hydrogen in the presence of a catalyst and under hydroprocessing conditions, typically, at elevated temperature and elevated pressure. Hydroprocessing includes, for example, processes such as hydrogenation, hydrodeoxygenation, hydrodesulfurization, hydrodenitrogenation, hydrodemetallization, hydrodearomatization, hydroisomerization, hydrodewaxing, hydrocracking and mild hydrocracking.

The term "transportation fuels" as used herein refer here to fractions or cuts or blends of hydrocarbons having distillation curves standardized for fuels, such as for diesel fuel (middle distillate from 160° C. to 380° C., according to EN 590), gasoline (40° C. to 210° C., according to EN 228), aviation fuel (160° C. to 300° C., according to ASTM D-1655 jet fuel), kerosene, naphtha, etc. Liquid fuels are hydrocarbons having distillation curves standardized for fuels, such as transportation fuels.

The term "ppm" as used herein means parts-per-million and is a weight relative parameter. A part-per-million is a microgram per gram, such that a component that is present at 10 ppm is present at 10 micrograms of the specific component per 1 gram of the aggregate mixture.

The term "upgrading" refers to a process wherein a feedstock is altered to have more desirable properties.

The term "biofuels" refers here to liquid fuels obtained from renewable feedstock (e.g., feedstock of biological origin).

An organic chloride contaminant level can be determined by X-ray Fluorescence Spectroscopy, e.g., ASTM D7536-09, Standard Test Method for Chlorine in Aromatics by Monochromatic Wavelength Dispersive X-ray Fluorescence Spectrometry.

As mentioned above, there is an increasing interest in alternative feedstocks for replacing at least partly crude oil, in the production of hydrocarbons suitable as fuels or fuel components, for example, as transportation fuels, or compatible with fuels. Biofuels are typically manufactured from feedstock originating from renewable sources. These feedstocks contain varying amounts of contaminants which are deleterious to converting catalysts.

Despite the ongoing research and development in the processing of lipid feedstocks and manufacture of fuels, there is still a need to provide an improved process for purifying lipid feedstock to provide a purified feedstock having little to no detectable chloride content which is suitable for converting to valuable chemicals, such as hydrocarbons suitable as fuels or fuel blending components. For example, fresh catalyst effectively removes chloride from the lipid feedstocks to yield oil products with no detectable chloride content. However, the chloride removing activity of the catalyst to continue to remove chloride from the lipid feedstocks slowly deteriorates over time and over the course of reaction/regeneration cycles due to, for example, the accumulation of metal impurities on the catalyst over time that are not removed during the coke burn. Accordingly, it would be desirable to rejuvenate (i.e., re-activate) the chloride removing activity of the metal oxide catalyst to further process other lipid feedstocks in order to continue to provide purified lipid feedstocks having little to no detectable chloride content, i.e., a chloride content less than 1 ppm or less than 0.5 ppm or less than 0.1 ppm.

The illustrative embodiments described herein overcome these and other drawbacks in providing an improved process for purifying renewable feedstocks to provide purified renewable feedstocks having little to no detectable chloride content which are then suitable for converting to valuable chemicals by re-activating the chloride removing activity of the spent metal oxide catalyst during the processing of lipid feedstocks. In non-limiting illustrative embodiments, a process comprises:

sequentially treating a plurality of lipid feedstocks comprising a set of lipid feedstocks each having a chloride content of at least about 2 ppm with a metal oxide catalyst on an oxide support under first treating conditions to produce respective treated streams of the set of lipid feedstocks each having a chloride content less than 1 ppm until a given one of the respective treated streams of the set of lipid feedstocks has a chloride content greater than 1 ppm and the metal oxide catalyst on the oxide support is converted to a spent metal oxide catalyst on the oxide support, converting the spent metal oxide catalyst on the oxide support to a rejuvenated metal oxide catalyst on the oxide support, and treating one or more additional lipid feedstocks each having a chloride content of at least about 2 ppm with the rejuvenated metal oxide catalyst on the oxide support under second treating conditions to produce one or more respective treated streams each having a chloride content less than 1 ppm.

First Treating Step

Lipid Feedstock

In step (a) of the illustrative embodiment, the lipid feedstocks originate from renewable or biological source or sources, and it is meant to include herein feedstocks other than those obtained from mineral oil, shale oil or coal.

In an illustrative embodiment, suitable lipid feedstocks for use herein can include, for example, from 0 to about 90 wt. % of free fatty acids, about 5 to 100 wt. % fatty acid glycerol esters (e.g., mono-, di-, triglycerides) and 0 to about 20 wt. % of one or more compounds selected from the group consisting of fatty acid esters of the non-glycerol type, fatty amides, and fatty alcohols. In an illustrative embodiment, as may be combined with with the preceding embodiment, the lipid feedstock comprises more than about 50 wt. % of free fatty acids and fatty acid glycerol esters such as about 70 wt. % or more, for example, about 80 wt. % or more and up to 100 wt. %.

In an illustrative embodiment, a lipid feedstock may include lipids (e.g., fats or oils) that originate, for example, from any type of plant, animal, microorganisms such as algae (e.g., algae oil, algae biomass, algae cultivation), fish and microbiological process. In an embodiment, the lipid feedstocks used include triglycerides.

Many different lipid feedstocks derived from plants can be used. In non-limiting illustrative embodiments, plant-based lipid feedstocks can include, for example, rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, *camellia* oil, castor oil, and olive oil, palm oil, coconut oil, rice oil, algae oil, seaweed oil, Chinese Tallow tree oil. Other plant-based lipid feedstocks can be obtained from, for example, argan, avocado, babassu palm, balanites, borneo tallow nut, brazil nut, calendula, camelina, caryocar, cashew nut, chinese vegetable tallow, cocoa, coffee, *cohune* palm, coriander, cucurbitaceae, *euphorbia*, hemp, *illipe, jatropha, jojoba*, kenaf, kusum, *macadamia* nuts, mango seed, noog *abyssinia*, nutmeg, opium poppy, *perilla, pili* nut, pumpkin seed, rice bran, *sacha* inche, *seje, sesame*, shea nut, teased, *allanblackia*, almond, *chaulmoogra, cuphea*, jatropa curgas, karanja seed, neem, *papaya*, tonka bean, tung, and ucuuba, cajuput, *Clausena anisata, davana, galbanum* natural oleoresin, german chamomile, *hexastylis*, high-geraniol *monarda*, juniapa-hinojo sabalero, lupine, *Melissa officinalis*, milfoil, ninde, patchouli, tarragon, and wormwood.

Many different lipid feedstocks derived from animals can also be used. In non-limiting illustrative embodiments, animal-based lipid feedstocks can include, for example, choice white grease, lard (pork fat), tallow (beef fat), fish oil, and poultry fat.

Many different lipid feedstocks derived from microorganisms (Eukaryotes, Eubacteria and Archaea) can also be used. In non-limiting illustrative embodiments, microbe-based lipid feed stocks can include, for example, the L-glycerol lipids of Archaea and algae and diatom oils. In some embodiments, lipid feed stocks derived from microorganisms can include bacteria, protozoa, algae, and fungi.

In some embodiments, lipid feedstocks derived from both plant and animal sources can be used such as, for example, yellow grease, white grease, and brown grease. In non-limiting illustrative embodiments, yellow, white or brown grease can include frying oils from deep fryers and can thus include fats of both plant and animal origin. Lipid feedstocks can specifically include used cooking oil. Brown grease (also known as trap grease) can include fats extracted from sewage systems and can thus include fats of both plant and animal origin. In some embodiments, lipid feedstocks used in embodiments can include non-biological lipid feedstocks. Lipid feedstocks of the invention can also include black oil.

In non-limiting illustrative embodiments, the lipid feedstocks include feedstocks originating from low value renewable waste materials, side streams, by-products, refining waste and residues, sewage sludge, and any combinations thereof.

In non-limiting illustrative embodiments, the lipid feedstocks may be selected from the group consisting of acidulated soap-stocks, fatty acid distillates from physical refining of plant oils or animal fats, distillers corn oil (DCO) from ethanol production, waste cooking oils, lard, brown grease, yellow grease, trap grease, waste fats, low-grade oils, supercritical water liquefaction oils (SCWL oils), plant oils, animal fats and any combination thereof.

In an illustrative embodiment, as may be combined with one or more of the preceding paragraphs, the lipid feedstocks comprise one or more of alkali metals, alkaline earth metals, and/or other metals, such as iron and manganese, that even in low amounts are often regarded as not suitable for catalytic treatment in refinery operations because each of the metals is an effective catalyst poison. The alkali metals, alkaline earth metals and other metals may typically comprise Na, K, Mg, Ca, Mn, Fe, or a combination thereof. The lipid feedstock may comprise at least about 1 ppm (e.g., about 1 to about 250 ppm, about 1 to about 100 ppm, about 1 to about 50 ppm, about 1 to about 25 ppm, about 2 to about 250 ppm, about 2 to about 100 ppm, or about 2 to about 25 ppm) of alkali metals, alkaline earth metals, metals of Groups VIIB and VIIIB, or combinations thereof, calculated as elemental metals, in total. Total metals content can be determined using AOCS Recommended Practice Ca 17-01.

In non-limiting illustrative embodiments, the lipid feedstocks can include low value lipid feedstocks, such as various types of animal fats and waste oils, which generally have a relatively high concentration of free fatty acids. One method of assessing the concentration of free fatty acids is to determine the total acid number (TAN) of the feedstock. The total acid number is the mass of potassium hydroxide (KOH) in milligrams that is required to neutralize one gram of the chemical substance being assessed.

In an illustrative embodiment, as may be combined with one or more of the preceding paragraphs, the lipid feedstocks may have a total acid number of at least about 5 mg KOH/g (e.g., about 5 to about 150 mg KOH/g, about 10 to about 150 mg KOH/g, from about 10 to about 100 mg KOH/g, from about 10 to about 50 mg KOH/g, from about 10 to about 25 mg KOH/g, or from about 10 to about 20 mg KOH/g). The total acid number can be determined using ASTM D664.

Lipid feedstocks typically contain varying amounts of impurities such as, for example, phosphorus, silicon, chloride, alkali metals, earth alkaline metals, other metals, etc. In an illustrative embodiment, as may be combined with one or more of the preceding paragraphs, the lipid feedstocks can contain varying amounts chloride such as at least about 2 ppm, or at least about 4 ppm or at least about 10 ppm (e.g., about 2 to about 100 ppm, about 2 to about 75 ppm, about 2 to about 50 ppm, about 10 to about 100 ppm, or about 10 to about 50 ppm) of chloride, where any of the lower limits can be combined with any of the upper limits.

In non-limiting embodiments, there can be additional lipid feedstocks present in the processing, in addition to the lipid feedstocks having a chloride content of at least about 2 ppm, that have a chloride content of less than 2 ppm. In other embodiments, there can be also be additional lipid feedstocks present in the processing, in addition to the lipid feedstocks having a chloride content of at least about 2 ppm, that have no chloride content.

In an illustrative embodiment, the lipid feedstocks may be pretreated. Suitable pretreatments include, but are not limited to, degumming, neutralization, bleaching, deodorizing, or any combination thereof.

Catalyst

The catalyst for use in step (a) is a fresh metal oxide catalyst on an oxide support. Suitable metals of the metal oxide include, for example, Na, K, Mg, Ca, Sr, Cr, Mo, Mn, Fe, Co, Ni, Cu, Zn, Al, rare earth metals, or a mixture thereof. In an illustrative embodiment, the metal oxide can be present in an amount ranging from about 0.1 to about 10 wt. %. In an illustrative embodiment, a suitable oxide support can be any suitable inorganic oxide support. Representative examples of such suitable oxide supports include, but are not limited to, alumina, silica, silica-alumina, titania, zirconia, or a mixture thereof. In one embodiment, the oxide support is one of alumina and silica-alumina where the silica content of the silica-alumina support can range from about 2 to about 30 wt. %. The alumina can be any of the aluminas conventionally used for hydroprocessing catalysts. Such aluminas are generally porous amorphous alumina having an average pore size from about 50 to about 200 angstroms. In non-limiting illustrative embodiment, the metal oxide catalyst comprises CaO, and the oxide support is alumina. However, this embodiment is merely exemplary, and any combination of the foregoing metal oxides and oxide supports are contemplated herein.

The metal oxide catalyst may be in any of the commonly used catalyst shapes such as, for example, spheres, granules, pellets, chips, rings, extrudates, or powders that are well-known in the art.

Treatment of the Lipid Feedstocks

The lipid feedstocks are sequentially treated with the metal oxide catalyst on an oxide support under treating conditions to produce respective treated streams comprising a liquid fraction comprising a bio-oil, which has a lower content of free fatty acids and impurities as compared to the respective starting lipid feedstocks, and the metal oxide catalyst. The obtained bio-oil, after further treatment as will be described hereinbelow, is particularly suitable as a renewable feedstock for hydroprocessing in biofuel manufacture.

Without being bound by theory, the treating is believed to proceed by a thermochemical process which includes one of more of cracking, decarboxylation, decarboxylation-coupling, dehydration and/or deoxygenation reactions.

In an illustrative embodiment, as may be combined with one or more of the preceding paragraphs, suitable treating conditions for the lipid feedstocks may comprise one or more of the following: a temperature in a range of from about 400° C. to about 700° C. (e.g., about 425° C. to about 650° C., or about 450° C. to about 600° C.); a pressure in a range of from 0 to about 10 MPa (e.g., about 0.1 to about 5 MPa, or about 0.1 to about 1 MPa); and a liquid hourly space velocity (LHSV) in a range of from about 0.1 to about 10 $h^{-1}$ (e.g., about 0.2 to about 5 $h^{-1}$, or about 0.3 to about 3 $h^{-1}$). Any of the lower limits described above can be combined with any of the upper limits.

The treatment of the lipid feedstocks with the metal oxide catalyst may be carried out in the presence of a carrier gas. Suitable carrier gases include, for example, hydrogen, nitrogen, carbon dioxide, $H_2O$ (water vapor) or $C_1C_4$ hydrocarbons (e.g., methane, ethane, propane or mixtures thereof). These gases may be admixed into the reaction mixture of the lipid feedstock and metal oxide catalyst and/or may be formed in the course of the reaction. The carrier gas may be used to expel gaseous or volatile reaction products from the product mixture such as carbon dioxide ($CO_2$) and $H_2O$ (water vapor).

The treatment of the lipid feedstocks with the metal oxide catalyst may be conducted in any suitable reactor or reactor configuration. Suitable reactor or reactor configurations include, for example, a fixed bed reactor, a moving bed, a slurry reactor, a fluidized bed reactor, an ebullating bed reactor, a transport bed reactor, a two-phase bed reactor, a riser reactor, and a batch reactor. The feed stream of the lipid feedstock can be flowed over the catalyst bed either up-flow or down-flow in any one of a liquid, vapor, or mixed phase.

The process may be batch-type or semi-batch-type or continuous, suitably a continuous process is used.

As one skilled in the art would understand, the process involves first treating a first lipid feedstock having a chloride content of at least about 2 ppm with a fresh metal oxide catalyst on an oxide support under first treating conditions to produce a first treated stream comprising a liquid fraction comprising a bio-oil, which has a lower content of chloride as compared to the starting first lipid feedstock, e.g., the first treated stream has a chloride content less than 1 ppm, or less than about 0.5 ppm, or less than about 0.01 ppm, or less than about 0.001 ppm of chloride, or a chloride content of 0 ppm.

The process then continues by treating a second lipid feedstock having a chloride content of at least about 2 ppm with the same metal oxide catalyst on the oxide support used for the treatment of the first lipid feedstock under second treating conditions to produce a second treated stream comprising a liquid fraction comprising a bio-oil, which has a lower content of chloride as compared to the starting second lipid feedstock, e.g., the second treated stream has a chloride content less than 1 ppm, or less than about 0.5 ppm, or less than about 0.01 ppm, or less than about 0.001 ppm of chloride, or a chloride content of 0 ppm.

The process further continues by sequentially treating additional lipid feedstocks having a chloride content of at least about 2 ppm each with the same metal oxide catalyst on the oxide support under respective treating conditions to produce respective treated streams having a chloride content less than 1 ppm, or less than about 0.5 ppm, or less than about 0.01 ppm, or less than about 0.001 ppm of chloride, or a chloride content of 0 ppm. As one skilled in the art will readily appreciate, the process can also sequentially treat additional lipid feedstocks having a chloride content of less than 2 ppm as discussed above each with the same metal oxide catalyst on the oxide support under respective treating conditions to produce respective treated streams.

The process still further continues until a given one of the respective treated streams has a chloride content greater than 1 ppm and the metal oxide catalyst on the oxide support is converted to a spent metal oxide catalyst on the oxide support. In other words, as discussed above, the ability of a metal oxide catalyst to remove impurities such as chloride from the lipid feedstock can slowly deteriorate the chloride removing activity of the metal oxide catalyst over time and over the course of reaction/regeneration cycles. Accordingly, when the chloride removing activity of the metal oxide catalyst has reached a point where it does not remove chloride to an amount of less than 1 ppm from the given lipid feedstock being treated, the metal oxide catalyst is partially deactivated. In the past, such deactivated catalysts are no longer sufficiently active for the desired chloride removal efficiency, and would need to be replaced with fresh catalyst, i.e., it would have to be unloaded and disposed of and a fresh metal oxide catalyst charge loaded. However, it has been discovered that is it possible to boost the chloride removing activity of the catalyst to regain or rejuvenate its chloride removing activity so that it does not have to be disposed of and replaced with fresh catalyst. Furthermore, the rejuvenation of the de-chlorination activity may be achieved on-site in the reactor without unloading the catalyst.

The resulting treated streams each comprising a liquid fraction comprising a bio-oil may comprise less than 1 ppm of alkali metals, alkaline earth metals, metals of the Groups VIIB and VIIIB of the Periodic Table of Elements (other metals), or combinations thereof, calculated as elemental metals, in total, preferably less than about 0.5 ppm.

The resulting treated streams each comprising a liquid fraction comprising a bio-oil may have a TAN of less than 5 mg KOH/g (e.g., less than 4 mg KOH/g, less than 3 mg KOH/g, less than 2 mg KOH/g, or less than 1 mg/KOH/g).

The bio-oil(s) obtained from the foregoing treatment steps, after further treatment as will be described hereinbelow, are particularly suitable as a renewable feedstock for hydroprocessing in biofuel manufacture.

Rejuvenated Catalyst Step

Following treatment of the respective lipid feedstocks with the metal oxide catalyst and oxide support to produce the resulting treated streams comprising a liquid fraction comprising a bio-oil with spent metal oxide catalyst on the oxide support, the spent metal oxide catalyst on the oxide support is converted to a rejuvenated metal oxide catalyst on the oxide support which has a chloride removing activity that is equal to or substantially similar to the fresh catalyst chloride removing activity.

In one non-limiting illustrative embodiment, the spent metal oxide catalyst can be converted to a rejuvenated metal oxide catalyst by spraying a solution of a water-soluble metal salt directly on the spent metal oxide catalyst. For example, a metal such as calcium can be added in the form of a solution of a water-soluble calcium salt such as calcium acetate that is sprayed directly onto the spent metal oxide catalyst. The solution of a water-soluble metal salt can be sprayed onto the spent metal oxide catalyst utilizing any known suitable spraying equipment. Suitable metal salts such as calcium salts include those that convert to any one of a calcium carbonate, a calcium oxide or a calcium hydroxide under the reaction conditions. Representative examples of suitable calcium salts include, but are not limited to, calcium nitrate, calcium hydroxide, calcium acetate or other calcium carboxylates. As one skilled in the art will readily appreciate, other metals such as magnesium and barium are also contemplated and can be used instead of calcium and may be deposited in a similar manner.

In an illustrative embodiment, the spent metal oxide catalyst can be converted to the rejuvenated metal oxide catalyst without removing the spent metal oxide catalyst from the reactor system. For example, in a non-limiting illustrative embodiment, a concentrated metal (e.g., calcium) salt solution can be sprayed on the spent metal oxide catalyst until the desired amount of metal has been added, and then the sprayed metal oxide catalyst is allowed to dry by heating up the reactor initially to a drying temperature (e.g., about 120° C. to about 200° C.) suitable for removing water and subsequently to a calcination temperature and to a suitable reaction temperature such as from about 400° C. to about 600° C. The metal salt such as calcium acetate will decompose under reaction conditions to form a corresponding calcium carbonate or calcium oxide. A desired amount of metal added to the spent metal oxide catalyst can be an amount sufficient to convert the spent metal oxide catalyst on the oxide support to the rejuvenated metal oxide catalyst on the oxide support. For example, a desired amount of metal added to the spent metal oxide catalyst can be from about 0.1 to about 10 wt. %.

In an illustrative embodiment, the spent metal oxide catalyst can be converted to the rejuvenated metal oxide catalyst by injecting a metal salt such as a calcium salt, a magnesium salt or a barium salt to the metal oxide catalyst with the lipid feedstock during the treatment of the lipid feedstock with the metal oxide catalyst on the oxide support. In an embodiment, the metal salt may in this case can be mixed with the lipid feedstock as an emulsion of the aqueous solution of the metal salts such as calcium acetate, in the oil feed. In an alternative embodiment, an oil-soluble form of the salt may be dissolved in the oil. Representative examples of an oil-soluble salt include acetylacetonate salts, which are known to be soluble in organic solvents. For example, calcium acetylacetonate is known to have a high solubility in a low molecular alcohol, such as methanol and ethanol.

Accordingly, in an embodiment, a solution of the oil-soluble metal salt in the low molecular weight alcohol can be injected into the lipid feedstock stream, e.g., an amount of about 0.05 to about 5 wt. % metal. In one embodiment, glycerin may be used as solvent for the oil soluble metal salt. In another alternative embodiment, a blend in a feed stock contains small amounts of calcium or magnesium, which are known impurities in some low-value lipid feedstocks. Injection of the metal salts with the lipid feedstock can be carried out in such reactor layouts as, for example, moving bed or fluid bed reactors in which more of the catalyst inventory over time is exposed to fresh feed as opposed to a fixed bed option, in which only a part of the catalyst inventory is close to the injection point of the feed.

Second Treating Step

Following converting the spent metal oxide catalyst on the oxide support to a rejuvenated metal oxide catalyst on the oxide support which has a chloride removing activity that is equal to or substantially similar to the chloride removing activity of the fresh metal oxide catalyst, the process continues by sequentially treating at least one or more additional lipid feedstocks having a chloride content of at least about 2 ppm with the rejuvenated metal oxide catalyst on the oxide support under treating conditions discussed above to produce respective treated streams each comprising a liquid fraction comprising a bio-oil, which has a lower content of chloride as compared to the starting lipid feedstock, e.g., the respective treated streams have a chloride content less than 1 ppm, or less than about 0.5 ppm, or less than about 0.01 ppm, or less than about 0.001 ppm of chloride, or a chloride content of 0 ppm.

As discussed above, there can be additional lipid feedstocks present in this processing step, in addition to the lipid feedstocks having a chloride content of at least about 2 ppm, that have a chloride content of less than 2 ppm. In other embodiments, there can be also be additional lipid feedstocks present in the processing, in addition to the lipid feedstocks having a chloride content of at least about 2 ppm, that have no chloride content.

The process then continues by sequentially treating additional lipid feedstocks each with the same rejuvenated metal oxide catalyst on the oxide support under respective treating conditions to produce respective treated streams having a chloride content less than 1 ppm, or less than about 0.5 ppm, or less than about 0.01 ppm, or less than about 0.001 ppm of chloride, or a chloride content of 0 ppm. The process continues until a given one of the respective treated streams again has a chloride content greater than 1 ppm and the metal oxide catalyst on the oxide support is converted to a spent metal oxide catalyst on the oxide support as discussed above.

The obtained bio-oil(s), after further treatment as will be described hereinbelow, is particularly suitable as a renewable feedstock for hydroprocessing in biofuel manufacture.

Hydroprocessing

Beneficially, the bio-oils produced by the process of the illustrative embodiments disclosed herein may be used directly as a refinery feedstock. The obtained bio-oil may be blended with one or more mineral oil feedstocks originating from crude oil, shale oil or coal and likewise used as a refinery feedstock.

If desired, the bio-oils may be subjected to a catalytic hydroprocessing step. The obtained at least one effluent (hydroprocessing product) may be fractionated in a fractionating step to provide hydrocarbon fractions, suitable as renewable fuels or fuel components, useful as transportation fuels, fuel components and other chemicals. The catalytic hydroprocessing step may be carried out in one step or in more than one step.

The catalytic hydroprocessing step may be carried out processing one or more fractions (such as distillation cuts) of the bio-oil separately or the bio-oil may be processed as a whole.

The catalytic hydroprocessing may comprise at least a hydrodeoxygenation step. Catalytic hydroprocessing may comprise a hydrodeoxygenation step followed by one or more steps selected from hydroisomerization and hydrocracking steps.

Hydroprocessing may be performed using one or more hydroprocessing catalysts comprising one or more metals selected from Group VIA and Group VIII metals. Particularly useful examples are Mo, W, Co, Ni, Pt and Pd. The catalyst(s) can also contain one or more support materials, for example zeolite, alumina, alumina-silica, zirconia, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on alumina may be used.

Hydroprocessing conditions can include a temperature of from about 100° C. to about 450° C. (e.g., about 200° C. to about 370° C., or about 230° C. to about 350° C.); a pressure of from about 0.5 to about 30 MPa (e.g., about 3 to about 25 MPa, or about 3 to about 12 MPa); a liquid hourly space velocity of from about 0.01 to about 10 $h^{-1}$ (e.g., about 0.1 to about 5 $h^{-1}$). The hydrogen gas treat rate can be in a range of from about 600 to about 4000 $Nm^3/m^3$ (e.g., about 1300 to about 2200 $Nm^3/m^3$).

The hydroprocessing occurs in a reaction stage. The reaction stage can comprise one or more reactors or reaction zones each of which comprises one or more catalyst beds of the same or different catalyst. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed.

At least one effluent from the hydroprocessing is drawn off from the last reactor. In one embodiment, the effluent is directed to a separator, such as any suitable separator or flashing unit. In the separator, typically water, gaseous stream comprising hydrogen, light hydrocarbons (e.g., $C_1$ to $C_5$ hydrocarbons), $H_2S$, CO and $CO_2$ are separated from the liquid component comprising >$C_5$ hydrocarbons and some $C_1$ to $C_5$ hydrocarbons. Water and gases may also be separated by other means which are well known to those skilled in the art.

The liquid hydrocarbon stream obtained from the hydroprocessing step includes fuel grade hydrocarbons having a boiling point of at most 380° C., according to ISO EN 3405. The person skilled in the art is able to vary the distilling conditions and to change the temperature cut point as desired to obtain any suitable hydrocarbon product, boiling suitably in the transportation fuel ranges.

The following illustrative example is intended to be non-limiting.

In the following example the chloride content is reported in ppm chloride by weight of the feed, or the weight of the composition and is determined by X-ray fluorescence on an XOS Chlora R bench-top analyzer.

Example

Into a ¾" reactor was loaded 50 ml of a calcium doped alumina catalyst, and then the following runs 1-3 were carried out as described below in which a lipid oil feedstock was processed over the calcium doped alumina catalyst in up flow in the presence of steam at a 1:1 steam/oil feed wt. ratio, at 900° F., ambient pressure and at a flow rate of about 30 to 40 g oil/hr. In a first run, 6 kg of a pretreated used cooking oil (UCO) feed containing 11 ppm chloride was processed. In a second run with the same batch of catalyst load, 10 kg of a chloride free soy bean oil feed was processed. No chloride was detected in the oil product from either run 1 or run 2. In a third run with the same batch of catalyst load, 1 kg of an untreated UCO feed containing 4.6 ppm chloride content was processed. Samples of oil product of run 3 were found to contain varying concentrations of chloride up to 1.8 ppm.

At this point, the calcium doped alumina catalyst was cooled, and a solution of 5 g calcium acetate dissolved in 30 ml water was poured on top of the catalyst bed still in the reactor. The calcium doped alumina catalyst was then slowly heated in nitrogen to 900° F. and brought back into operation. Next, in a fourth run, 10 kg of an untreated UCO feed containing 4.6 ppm chloride content was processed at the above conditions. There was no chloride detected in the processed product after the calcium addition to the calcium doped alumina catalyst.

According to an aspect of the present disclosure, a process comprises:

(a) sequentially treating a plurality of lipid feedstocks comprising a set of lipid feedstocks each having a chloride content of at least about 2 ppm with a metal oxide catalyst on an oxide support under first treating conditions to produce respective treated streams of the set of lipid feedstocks having a chloride content less than 1 ppm until a given one of the respective treated streams of the set of lipid feedstocks has a chloride content greater than 1 ppm and the metal oxide catalyst on the oxide support is converted to a spent metal oxide catalyst on the oxide support, (b) converting the spent metal oxide catalyst on the oxide support to a rejuvenated metal oxide catalyst on the oxide support, and (c) treating one or more additional lipid feedstocks each having a chloride content of at least about 2 ppm with the rejuvenated metal oxide catalyst on the oxide support under second treating conditions to produce one or more respective treated streams each having a chloride content less than 1 ppm.

In one or more additional illustrative embodiments, as may be combined with the preceding paragraphs, the plurality of lipid feedstocks and the one or more additional lipid feedstocks independently comprise at least one fatty acid selected from the group consisting of an acidulated soapstock, a fatty acid distillate from physical refining of plant oils or animal fats, a distiller corn oil from ethanol production, a waste cooking oil, lard, brown grease, yellow grease, trap grease, a waste fat, a low-grade oil, a supercritical water liquefaction oil, a plant oil, an animal fat, and any combination thereof.

In one or more additional illustrative embodiments, as may be combined with the preceding paragraphs, sequentially treating a plurality of lipid feedstocks with the metal oxide catalyst on the oxide support under first treating conditions comprises (i) treating one or more first lipid feedstocks with the metal oxide catalyst under the first treating conditions to produce a first treated stream having a chloride content less than 1 ppm; (ii) treating one or more second lipid feedstocks with the metal oxide catalyst under the first treating conditions to produce a second treated stream having a chloride content less than 1 ppm; (iii) treating one or more third lipid feedstocks with the metal oxide catalyst under the first treating conditions to produce a third treated stream having a chloride content less than 1 ppm; and (iv) treating one or more fourth lipid feedstocks with the metal oxide catalyst under the first treating conditions to produce a fourth treated stream having a chloride content greater than 1 ppm.

In one or more additional illustrative embodiments, as may be combined with the preceding paragraphs, the first treating conditions and the second treating conditions independently include one or more of the following: a temperature in a range of from about 400° C. to about 700° C., a pressure in a range of from about 0.1 to about 10 MPa, and a liquid hourly space velocity in a range of from about 0.1 to about 10 $h^{-1}$.

In one or more additional illustrative embodiments, as may be combined with the preceding paragraphs, the metal oxide catalyst comprises a metal selected from the group consisting of Na, K, Mg, Ca, Ba, Sr, Cr, Mo, Mn, Fe, Co, Ni, Cu, Zn, Al, rare earth metals, and any combination thereof, and the oxide support is selected from the group consisting of alumina, silica, silica-alumina, titania, zirconia, and any combination thereof.

In one or more additional illustrative embodiments, as may be combined with the preceding paragraphs, the metal oxide catalyst comprises a metal selected from the group consisting of Ca, Mg, Ba and any combination thereof.

In one or more additional illustrative embodiments, as may be combined with the preceding paragraphs, the metal oxide catalyst comprises CaO and the oxide support comprises alumina.

In one or more additional illustrative embodiments, as may be combined with the preceding paragraphs, converting the spent metal oxide catalyst on the oxide support to a rejuvenated metal oxide catalyst on the oxide support comprises contacting the spent metal oxide catalyst with a solution comprising a water-soluble metal salt.

In one or more additional illustrative embodiments, as may be combined with the preceding paragraphs, the metal of the water-soluble metal salt is one of calcium, magnesium or barium.

In one or more additional illustrative embodiments, as may be combined with the preceding paragraphs, contacting the spent metal oxide catalyst with a solution of a water-soluble metal salt comprises spraying a solution comprising one of calcium nitrate, calcium hydroxide, calcium acetate or a calcium carboxylate onto the spent metal oxide catalyst, where the spent metal oxide catalyst comprises CaO.

In one or more additional illustrative embodiments, as may be combined with the preceding paragraphs, step (a) is carried out in a reactor system, and the converting the spent metal oxide catalyst on the oxide support to the rejuvenated metal oxide catalyst on the oxide support is carried out without removing the spent metal oxide catalyst from the reactor system.

In one or more additional illustrative embodiments, as may be combined with the preceding paragraphs, converting the spent metal oxide catalyst on the oxide support to the rejuvenated metal oxide catalyst on the oxide support comprises spraying a solution comprising a water-soluble metal salt on the spent metal oxide catalyst on the oxide support and heating the reactor.

In one or more additional illustrative embodiments, as may be combined with the preceding paragraphs, the solution comprising the water-soluble metal salt is a solution of calcium acetate and the spent metal oxide catalyst comprises CaO.

In one or more additional illustrative embodiments, as may be combined with the preceding paragraphs, treating of step (a) and step (c) is carried out under flow of a carrier gas.

In one or more additional illustrative embodiments, as may be combined with the preceding paragraphs, the carrier gas is nitrogen, carbon dioxide, a $C_1$ to $C_4$ hydrocarbon, water, or a mixture thereof.

In one or more additional illustrative embodiments, as may be combined with the preceding paragraphs, the plurality of lipid feedstocks and the one or more additional lipid feedstocks independently exhibit at least one of the following properties:
(i) a total acid number of at least about 5 mg KOH/g, as determined by ASTM D664, and
(ii) about 2 ppm to about 100 ppm of chloride.

In one or more additional illustrative embodiments, as may be combined with the preceding paragraphs, the process further comprises fractionating one or more of the respective treated streams of step (a) and the one or more respective treated streams of step (c) to obtain a gaseous fraction and a liquid fraction comprising a bio-oil.

In one or more additional illustrative embodiments, as may be combined with the preceding paragraphs, the process further comprises subjecting the bio-oil to a catalytic hydroprocessing step to provide a hydroprocessed product.

In one or more additional illustrative embodiments, as may be combined with the preceding paragraphs, the catalytic hydroprocessing comprises a hydrodeoxygenation step.

In one or more additional illustrative embodiments, as may be combined with the preceding paragraphs, at least one of the respective treated streams of step (a) and the one or more respective treated streams of step (c) has a chloride content equal to 0.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:
1. A process, comprising:
(a) sequentially treating a plurality of lipid feedstocks comprising a set of lipid feedstocks each having a chloride content of at least about 2 ppm with a metal oxide catalyst on an oxide support having a chloride removing activity under first treating conditions to produce respective treated streams of the set of lipid feedstocks having a chloride content less than 1 ppm until the chloride removing activity of the metal oxide catalyst on the oxide support produces a given one of the respective treated streams of the set of lipid feedstocks having a chloride content greater than 1 ppm and the metal oxide catalyst on the oxide support is converted to a spent metal oxide catalyst on the oxide support;
(b) re-activating the chloride removing activity of the spent metal oxide catalyst on the oxide support to produce a rejuvenated metal oxide catalyst on the oxide support, wherein the re-activating comprises contacting the spent metal oxide catalyst on the oxide support with a solution comprising a water-soluble metal salt; and
(c) treating one or more additional lipid feedstocks each having a chloride content of at least about 2 ppm with the rejuvenated metal oxide catalyst on the oxide support under second treating conditions to produce one or more respective treated streams each having a chloride content less than 1 ppm.

2. The process according to claim 1, wherein the plurality of lipid feedstocks and the one or more additional lipid feedstocks independently comprise at least one fatty acid selected from the group consisting of an acidulated soapstock, a fatty acid distillate from physical refining of plant oils or animal fats, a distiller corn oil from ethanol production, a waste cooking oil, lard, brown grease, yellow grease, trap grease, a waste fat, a low-grade oil, a supercritical water liquefaction oil, a plant oil, an animal fat, and any combination thereof.

3. The process according to claim 1, wherein the sequentially treating the plurality of lipid feedstocks with the metal oxide catalyst on the oxide support under the first treating conditions comprises (i) treating one or more first lipid feedstocks with the metal oxide catalyst on the oxide support under the first treating conditions to produce a first treated stream having a chloride content less than 1 ppm; (ii) treating one or more second lipid feedstocks with the metal oxide catalyst on the oxide support under the first treating conditions to produce a second treated stream having a chloride content less than 1 ppm; (iii) treating one or more third lipid feedstocks with the metal oxide catalyst on the oxide support under the first treating conditions to produce a third treated stream having a chloride content less than 1 ppm; and (iv) treating one or more fourth lipid feedstocks with the metal oxide catalyst on the oxide support under the first treating conditions until the chloride removing activity of the metal oxide catalyst on the oxide support produces a fourth treated stream having a chloride content greater than 1 ppm.

4. The process according to claim 1, wherein the first treating conditions and the second treating conditions independently include one or more of the following: a temperature in a range of from about 400° C. to about 700° C., a pressure in a range of from about 0.1 to about 10 MPa, and a liquid hourly space velocity in a range of from about 0.1 to about 10 h$^{-1}$.

5. The process according to claim 1, wherein the metal oxide catalyst comprises a metal selected from the group consisting of Na, K, Mg, Ca, Ba, Sr, Cr, Mo, Mn, Fe, Co, Ni, Cu, Zn, Al, rare earth metals, and any combination thereof, and the oxide support is selected from the group consisting of alumina, silica, silica-alumina, titania, zirconia, and any combination thereof.

6. The process according to claim 1, wherein the metal oxide catalyst comprises a metal selected from the group consisting of Ca, Mg, Ba and any combination thereof.

7. The process according to claim 1, wherein the metal oxide catalyst comprises CaO and the oxide support comprises alumina.

8. The process according to claim 1, wherein the metal of the water-soluble metal salt is one of calcium, magnesium or barium.

9. The process according to claim 1, wherein contacting the spent metal oxide catalyst on the oxide support with the solution of the water-soluble metal salt comprises spraying a solution comprising one of a calcium nitrate, a calcium hydroxide, a calcium acetate or a calcium carboxylate onto the spent metal oxide catalyst on the oxide support, where the spent metal oxide catalyst comprises CaO.

10. The process according to claim 1, wherein step (a) is carried out in a reactor system, and the re-activating the chloride removing activity of the spent metal oxide catalyst on the oxide support to produce the rejuvenated metal oxide catalyst on the oxide support is carried out without removing the spent metal oxide catalyst on the oxide support from the reactor system.

11. The process according to claim 10, wherein the re-activating the chloride removing activity of the spent metal oxide catalyst on the oxide support to produce the rejuvenated metal oxide catalyst on the oxide support comprises spraying the solution comprising the water-soluble metal salt on the spent metal oxide catalyst on the oxide support and heating the reactor system.

12. The process according to claim 11, wherein the solution comprising the water-soluble metal salt is a solution of calcium acetate and the spent metal oxide catalyst comprises CaO.

13. The process according to claim 1, wherein the treating of step (a) and step (c) is carried out under flow of a carrier gas.

14. The process according to claim 13, wherein the carrier gas is nitrogen, carbon dioxide, a $C_1$ to $C_4$ hydrocarbon, water, or a mixture thereof.

15. The process according to claim 1, wherein the plurality of lipid feedstocks and the one or more additional lipid feedstocks independently exhibit at least one of the following properties:
(i) a total acid number of at least about 5 mg KOH/g, as determined by ASTM D664; and
(ii) about 2 ppm to about 100 ppm of chloride.

16. The process according to claim 1, further comprising fractionating one or more of the respective treated streams of step (a) and the one or more respective treated streams of step (c) to obtain a gaseous fraction and a liquid fraction comprising a bio-oil.

17. The process according to claim 16, further comprising subjecting the bio-oil to a catalytic hydroprocessing step to provide a hydroprocessed product.

18. The process according to claim 17, wherein the catalytic hydroprocessing step comprises a hydrodeoxygenation step.

19. The process according to claim 1, wherein at least one of the respective treated streams of step (a) and the one or more respective treated streams of step (c) has a chloride content equal to 0.

20. The process according to claim 1, wherein the contacting the spent metal oxide catalyst on the oxide support with the solution comprising the water-soluble metal salt comprises injecting the solution comprising the water-soluble metal salt into the one or more additional lipid feedstocks.

* * * * *